United States Patent
Childers, Jr. et al.

(10) Patent No.: US 8,935,570 B2
(45) Date of Patent: Jan. 13, 2015

(54) AUTOMATING INFRASTRUCTURE WORKFLOWS AS ATOMIC TRANSACTIONS

(75) Inventors: Jerry W. Childers, Jr., Philadelphia, PA (US); Christopher T. Sears, Avondale Estates, GA (US); Rajagopalan Subrahmanian, Coatesville, PA (US)

(73) Assignee: Sungard Availability Services, LP, Wayne, PA (US)

( * ) Notice: Subject to any disclaimer, the term of this patent is extended or adjusted under 35 U.S.C. 154(b) by 100 days.

(21) Appl. No.: 13/551,848

(22) Filed: Jul. 18, 2012

(65) Prior Publication Data
US 2014/0025984 A1    Jan. 23, 2014

(51) Int. Cl.
*G06F 11/14* (2006.01)
(52) U.S. Cl.
USPC ............................................................ 714/19
(58) Field of Classification Search
CPC ..... H04L 41/0803; H04L 41/22; H04L 29/06; H04L 41/8066; H04L 45/50; H04L 63/0853; H04L 63/102; H04L 63/105; H04L 63/12; H04L 41/0889; H04L 63/104; H04L 41/0853
USPC ........................................................ 714/1–57
See application file for complete search history.

(56) References Cited

U.S. PATENT DOCUMENTS

| 6,704,752 | B1 * | 3/2004 | Kathail et al. .................... 1/1 |
| 6,804,798 | B2 * | 10/2004 | Guha et al. .................. 714/49 |
| 7,779,404 | B2 * | 8/2010 | Movassaghi et al. ......... 717/171 |
| 2006/0007944 | A1 * | 1/2006 | Movassaghi et al. ......... 370/401 |
| 2013/0007258 | A1 * | 1/2013 | Stern et al. ................... 709/224 |
| 2014/0025984 | A1 * | 1/2014 | Childers et al. ............... 714/4.1 |

OTHER PUBLICATIONS

*vSphere Virtual Machine Administration Guide*, ESX 4.1, VMware, Inc., Palo Alto, CA, 2011, 166 pages.
*Datacenter as a Service: Cloud Management Center*, DASS.com, ingu.com, 2011, 5 pages.
*Microsoft Computer Dictionary*, Fifth Edition, Copyright 2002, Microsoft Press, Redmond, Washington, pp. 123, 497-498.

* cited by examiner

*Primary Examiner* — Nadeem Iqbal
(74) *Attorney, Agent, or Firm* — Cesari and McKenna, LLP

(57) ABSTRACT

Information Technology (IT) system configuration is managed using a set of defined flows with atomic execution properties. The instructions to execute a change to one or more infrastructure elements (a "forward transaction") are maintained with instructions and/or information needed to execute a corresponding "reverse" transaction that is responsible for returning the element(s) to a pre-transaction action state in the event of a configuration failure or other request originating at a high level flow.

17 Claims, 6 Drawing Sheets

AUTOMATING INFRASTRUCTURE WORKFLOWS AS ATOMIC TRANSACTIONS

BACKGROUND

Information technology (IT) professionals increasingly find the Infrastructure as a Service (IaaS) model to be flexible, easy, and cost-effective way to deliver the services their users need. The ability to specify IT infrastructure and applications remotely and on demand provides flexibility to build out only those resources that exactly fit user requirements at a given time. Additional benefits provided by professional cloud service providers include the ability to adjust rapidly to changes in demand, access to equipment with superior performance, built-in enterprise level security, disaster recovery, and other functions.

IaaS solutions combine remotely hosted physical IT infrastructure and virtualization technologies to provide a simplified, abstracted operating model to end-users. Virtualization decouples physical hardware from operating systems, applications and other information technology resources. Virtualization allows multiple virtual machines with different operating systems and applications to run in isolation side-by-side on a physical machine. Such virtual machines are a software representation of a physical machine, specifying its own set of virtual hardware resources such as processors, memory, storage, network interfaces, and so forth. Additional network virtualization technologies offered by some providers allows their tenants to add other elements such as Virtual Local Area Networks (VLANs), virtual firewall, virtual load balancers and other virtual resources. Cloud service providers frequently allow users to specify groups of logically related virtual elements as components of a Virtual Data Center (VDC) construct that can be deployed, configured and managed as a single unit.

Delivering a simplified, abstracted service to IT customers comes at the cost of increased complexity for the service provider. One significant area of complexity is providing a strong security and isolation in a dynamic, multitenant environment. For example, any changes requested by one customer must not disrupt another customer's services or expose one customer's data to another customer. With the rapid pace of configuration changes in a cloud service provider's infrastructure, automating these changes using software is critical. To avoid serious configuration errors when such a change must be coordinated across multiple elements of IT infrastructure, it becomes desirable to conduct these changes as distributed atomic transactions.

Atomicity of provisioning operations should especially apply in cloud environments that use a common physical infrastructure to support multiple tenants. Delivering this guarantee can complex. For example, a single physical switch may need to support VLANs for different tenants. It is often the case that tenants wish to control their own VLAN settings and manipulate switch port settings, however the service provider must ensure that a customer cannot make configuration changes that permit them to access other customer's data.

SUMMARY

In specific implementations discussed herein, IT infrastructure environment configuration management software is implemented using a set of defined modular workflows, or "flows", that can be executed together as an atomic transaction. Each flow contains two sets of programmatic instructions: (1) a "forward transaction" to perform a change to one or more infrastructure elements and (2) a "reverse transaction" to return the elements to a pre-transaction action state in the event of a configuration failure.

In specific embodiments discussed in greater detail below, one or more configuration workflows specify a set of changes to be made to an element of an Information Technology (IT) infrastructure. The flows are arranged as transactions to be implemented, for example, to virtual elements assigned to a single tenant in a cloud service environment. The virtual elements will typically be physically implemented on hardware servicing multiple tenants. The flows expose a set of configuration commands as a do( ) method for the forward transaction and an undo( ) method for the reverse transaction. The do( ) method is guaranteed to reverse any effect of execution of the do( ) method. The undo( ) method of the flow object may use the inputs and results of the do( ) method and may use information concerning the original state of the affected IT element.

Before any changes are performed, the do( ) method can obtain the original state of the IT elements involved by calling a CurrentState( ) method exposed by lower-level automation components responsible for tracking the configuration of those elements. This state information is preferably limited to those attributes that can possibly be affected by its associated do( ) method, and need not include the entire set of configuration information for each infrastructure element.

In operation, the do( ) method is first executed. If no error results, the flow can be terminated with the assumption that the change has been successfully implemented.

However, if an error or other exception occurs as result of the do( ) then the corresponding undo( ) method, having access to the stored original state information and the new current state, can formulate a set of compensating commands that return the IT infrastructure element to state that existed prior to execution of the do( ) method. Atomicity is therefore achieved.

By arranging all configuration changes as flow objects of this type, changes can also be aggregated and/or stacked for automated execution. Change requests that require executing do( ) methods on more than one network element for example can be carried out as a series of transactions. Providing the ability for a higher level flow to call the undo( ) method of lower level flow can guarantee that the IT infrastructure can be reliably returned to its original state in the event that any one of the flows encounters an error condition. Furthermore, because the flow execution framework maintains responsibility for tracking which flows in a sequence have executed and calling the undo( ) methods as needed. As a result, the undo( ) logic of each individual flow can avoid dealing with the global state of the higher level flows and side effects of other peer flows.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

The present disclosure is related in particular to a framework that supports a workflow for automating implementation of and/or changes to an information technology (IT) infrastructure. The framework is particularly advantageous where the infrastructure is used to service multiple tenants where physical resources may be virtualized, and the resources for each tenant need to be independently managed. The framework allows atomic transaction flow to be created and assembled into aggregate workflows. The fundamental transaction building blocks include internal exception handling and recovery in response to parent flow requests for a transaction rollback.

Figure 1:
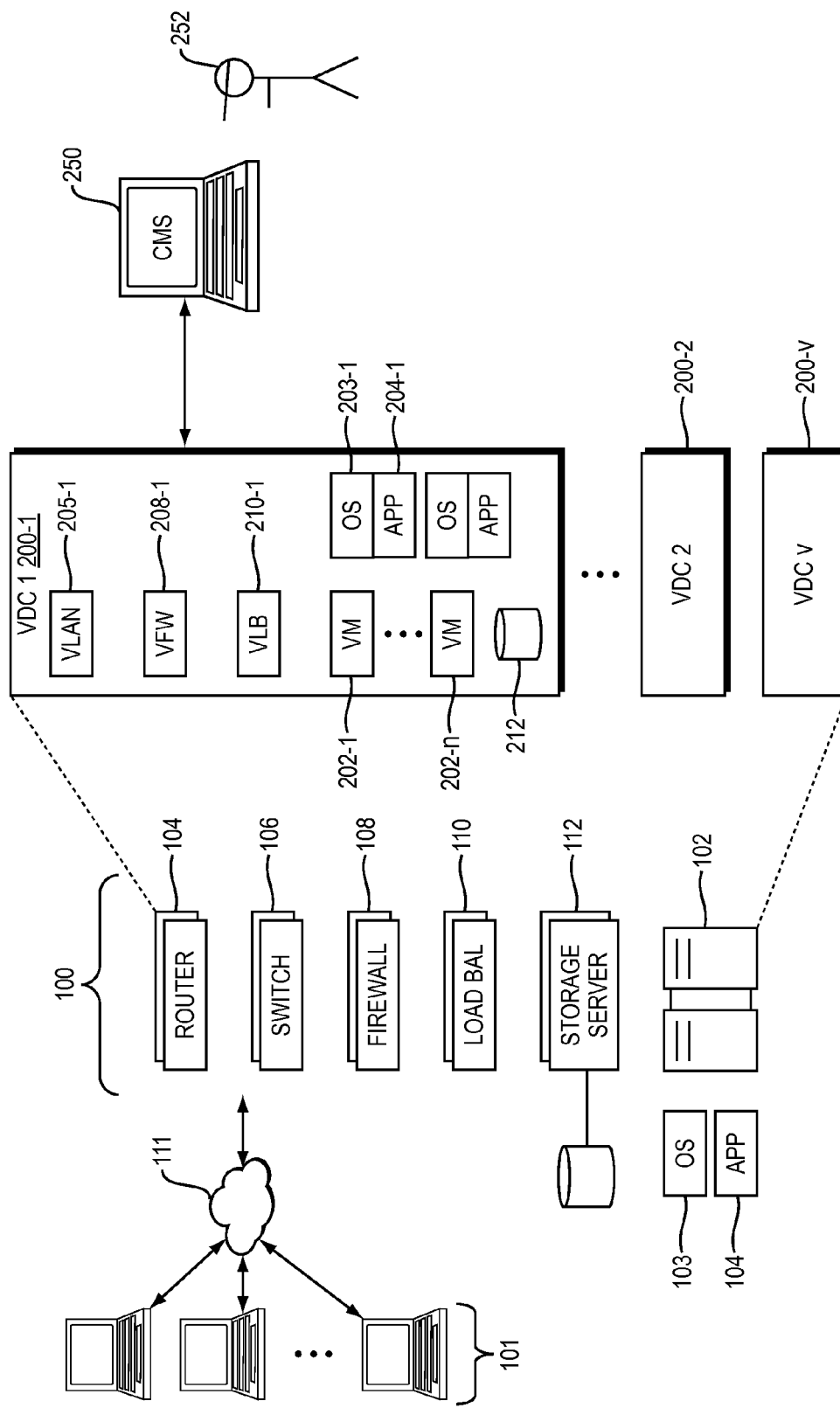
FIG. 1 is a high-level diagram of an information technology (IT) environment operated by a service provider that offers cloud services to multiple tenants.

FIG. 1 is a high-level diagram of a typical IT environment 100 in which this framework may be used to service multiple customers or tenants 101. The IT environment 100 consists of a number of physical data processing machines and other IT resources such as one or more servers 102 that each have an operating system 103 and/or applications 104, internetworking equipment such as routers 104, switches 106, firewalls 108 and load balancers 110. Additional data processing equipment such as one or more storage servers 112 are also typically part of the environment 100.

Servers 102 may include web servers, database servers, application servers, storage servers, security appliances or other types of machines. Servers utilize an operating system and application(s) but also other data processing services, features, functions, software, and other aspects not described here as those details are not germane.

The resources provided by environment 100 are accessed by multiple users or tenants via network connections such that the environment 100 appears to the users 101 to be a cloud service. The physical infrastructure actually supports a number of virtual infrastructure elements for each of the tenants 101. The virtual infrastructure elements may take the form of virtual data centers (VDCs) 200-1, 200-2, . . . 200-v although many other configurations are possible. An example VDC 200-1 may consist of a number of virtual machines (VMs) 202-1, . . . , 202-n. A VM 202-1 has typically associated with a respective operating system 203-1 and application 204-1. The VDC 202-1 may also include one or more Virtual Local Area Networks (VLANs) 205-1, virtual firewalls 208-1, virtual load balancers 210-1 and other virtual infrastructure elements such as virtual storage 212-1. From the perspective of a given tenant 101, the tenant has access to many different VDC's 200 that can be configured to run applications that he has arranged. These VDCs 200 may include one or many VMs 201 and other virtual resources. It should therefore be understood that while FIG. 1 shows only a single type of each physical and virtual infrastructure element, any given VDC 200 may have multiple virtual routers, virtual firewalls, VLANs and even multiple virtual storage servers, application servers and the like that are not shown in detail.

Tenants 101 make use of the configuration management system 250, or CMS, to specify the original configuration of their VDCs such as how many VMs 201, installed operating systems 203 and applications 204, VLANs 205 and other virtual resources. From time to time tenant 101, or the operator of the environment upon requests from the tenant, also implement changes to these elements of their VDCs. The tenant assumes the service provider operating the environment 100 provides security, high availability and of interest here, the atomic execution of any changes performed on these elements.

Many VMs 200 may be hosted on a single physical server 102, and that in general, the physical devices such as routers 104, switches 106, firewalls 108, load balancers 110, and storage servers 112 service many different tenants 101. But configurations requested by a given tenant 101 to any resource, be it virtual or physical, should only affect the physical virtual infrastructure that is associated with that tenant 101 and should not have any adverse effects on the physical or virtual infrastructure associated with other tenants 101.

The many different VDCs 200 are under control of many different administrative users who each expect to be able fully configure the virtual infrastructure elements the service provider has offered to them. The CMS 250 allows these administrative users to interact with and configure their infrastructure elements. The CMS 250 may be located in the same physical location as the service provider environment 100, elsewhere on the premises of the service provider, at the tenant premises, or remotely located but securely accessed by the tenants' administrative users.

Figure 2:
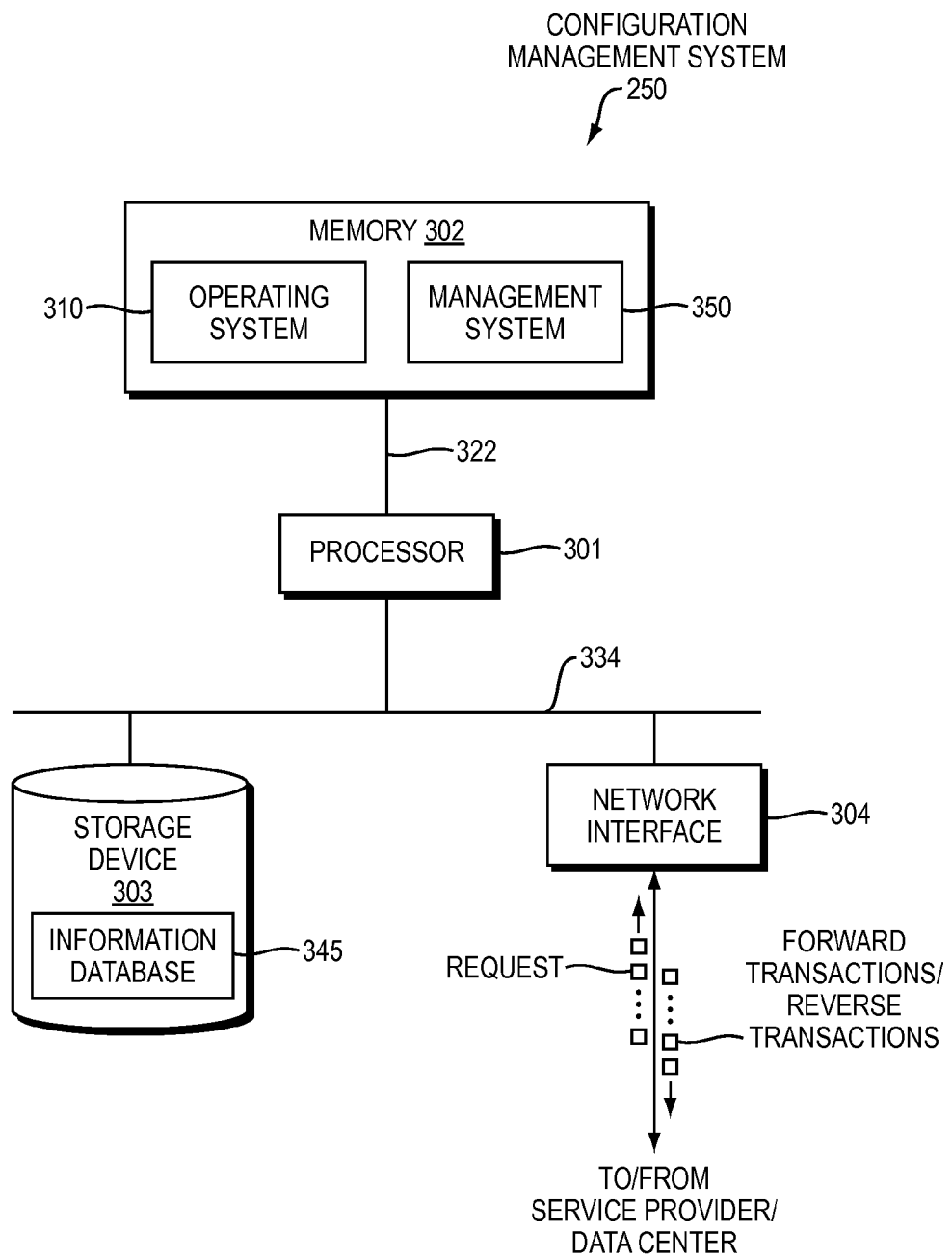
FIG. 2 is a diagram of a configuration management system showing how change requests may originate as a flow of forward transactions and associated reverse transactions.

FIG. 2 is a more detailed view of a CMS 250. It is typically implemented on a data processor 301 that itself has memory 302, storage 303 and a network interface 304. The management system is implemented as software 350 stored in memory 301 and recalled and executed by the processor 301 as aided by the existence of an operating system 310 that also executes on processor 301.

Storage device 303 is used to retain information in a database 345, such as the workflow frameworks discussed below. Network interface 304 is utilized by the CMS 250 to infrastructure management requests as a set of transactions and/or associated reverse transactions to the service provider infrastructure elements described.

Figure 3:
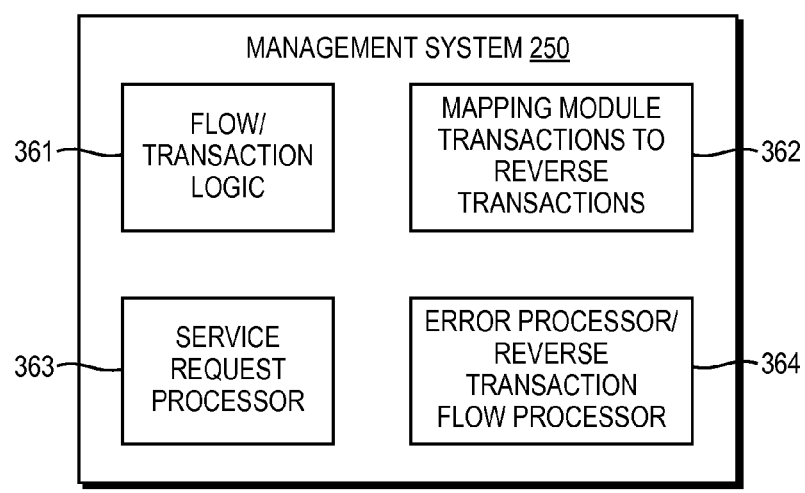
FIG. 3 is a diagram of the management system elements.

FIG. 3 is a high level view of an example workflow framework 360. It includes state save logic 361, forward flow transaction method logic 362, reverse flow transaction logic 363, and state restore logic 36. In operation, the forward flow transaction logic 362 stores instructions to be carried out to implement initial configuration and/or changes to one of the elements of IT infrastructure in environment 100. The forward flow transaction logic is selected from a set of methods that carry out a specific change to a specific type of element. The need to execute the forward flow may originate as specified by an administrative user via a web interface, who determines a specific flow, and then requests execution of the flow to implement the change.

The workflow framework also includes an associated reverse transaction flow logic 363 which is executed in the event that a change needs to be rolled back.

A state save logic flow 361 and state restore logic flow 364 associated with the framework 360 are called by the forward and reverse transaction flows as needed. These may store and retrieve state information in the database 345.

Figure 4:
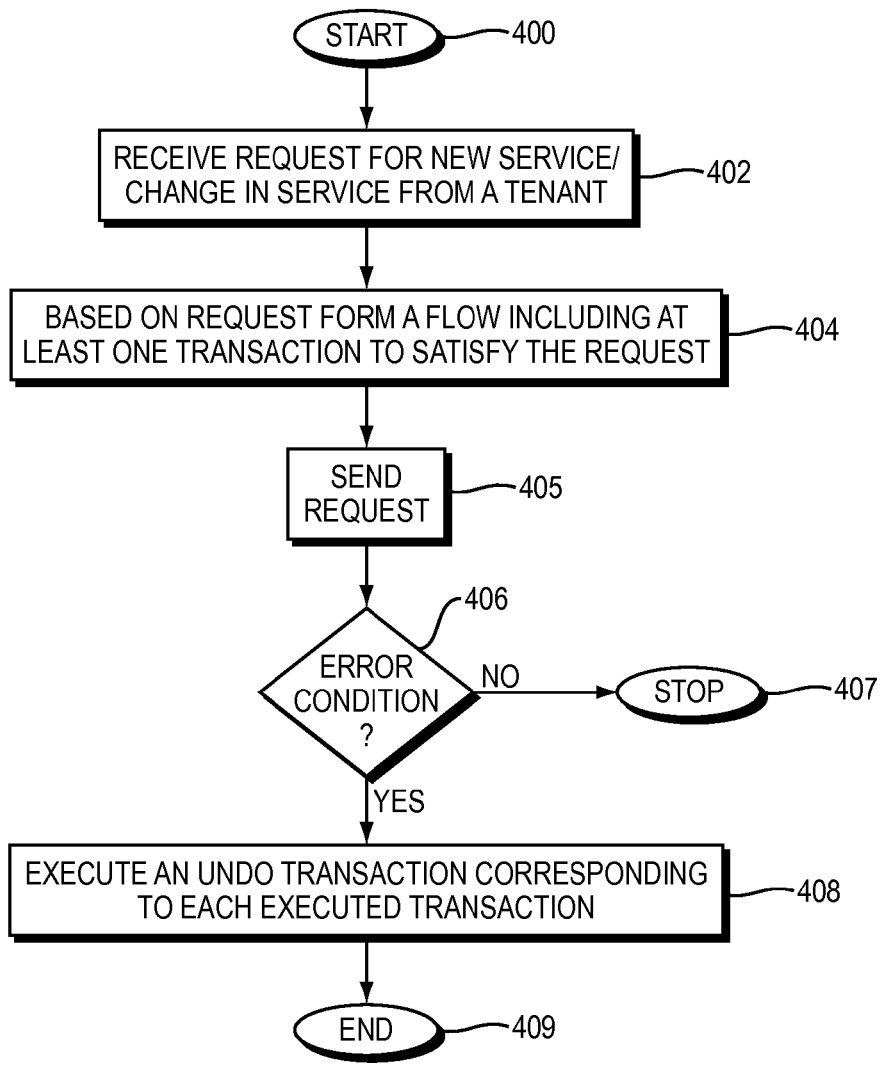
FIG. 4 illustrates flow execution.

FIG. 4 is a high level diagram illustrating the general sequence of events when executing a workflow 360. From an initial state 400 a request is received for a new service and/or a change in service such as via the web interface mention above. This request can originate automatically from a tenant 101 or the service provider that is operating the IT environment 100. In state 404 the request is analyzed to identify at least one framework to satisfy the request. The framework is then executed in state 405 such as by executing the corresponding forward transaction method logic 362, which in turn causes commands to be sent to the effected virtual and/or physical infrastructure elements. In state 406, if no error condition is returned, then processing can stop.

However if an error is returned, then an associated reverse transaction method 363 corresponding to the executed forward transaction 362 is performed in state 408.

Figure 5:
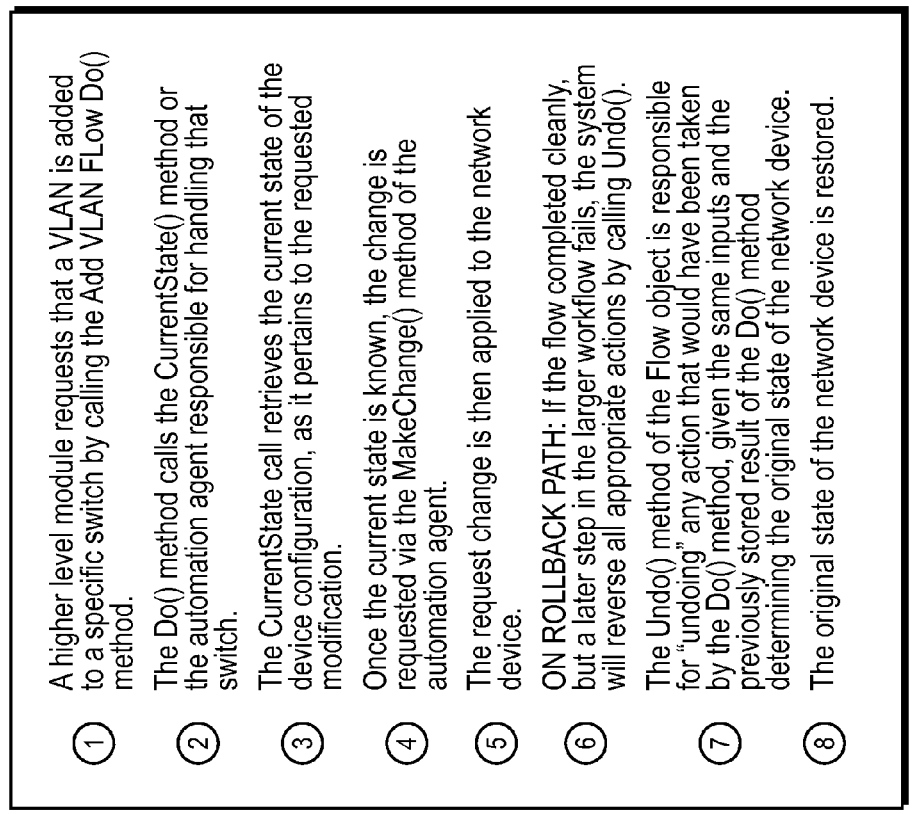
FIG. 5 is an example flow object that implements a change to a Virtual Local Area Network (VLAN) element.
Figure 5:
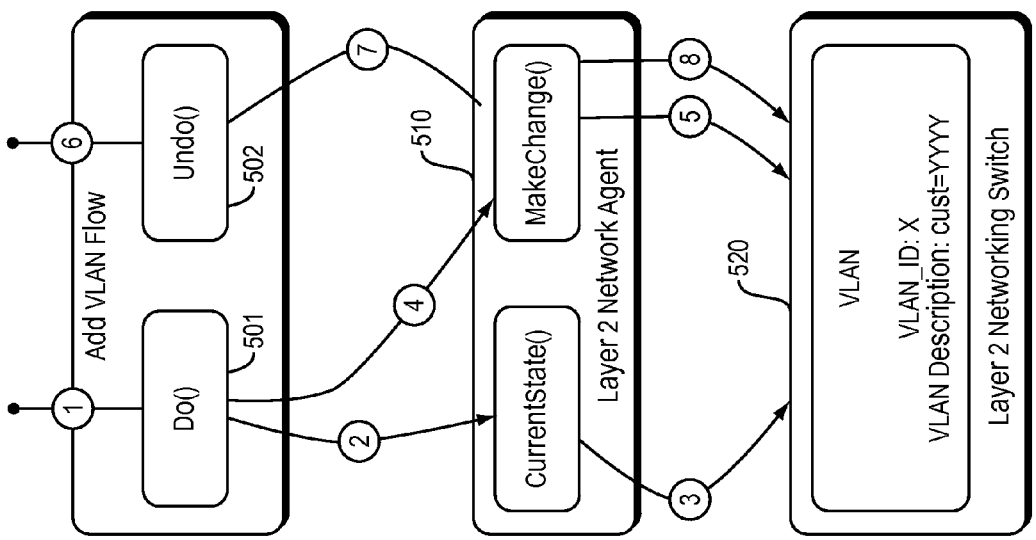

FIG. 5 is a more specific example of a workflow 360 that is executed to add a new VLAN.

It is significant to note that to accomplish this change, a particular forward transaction is specified as a do( ) method, and that a corresponding reverse transaction is specified as an undo( ) method as part of the same workflow 360. A complex orchestration of multiple flows can therefore be implemented as a set of atomic transactions such that each step can be parallelized or serialized in a more complex orchestration. Whenever a particular point is reached where a condition requires a rollback, the undo( ) instructions needed to successfully roll back the system are immediately, automatically, and inherently available.

Here at a higher-level module requests that VLAN be added to a specific switch. This is done by calling the "add VLAN" flow, causing execute of a do( ) method 501. Do( ) method 501 first calls a CurrentState( ) method provided by lower-level automation agent responsible for handling that particular switch. The CurrentState( ) method retrieves the current state of the switch configuration as it pertains to the request. The state information retrieved is preferably not the entire state information for the switch, but rather is limited to the switch state that could potentially be affected by the execution of the corresponding do( ) method. The state information retrieved from the switch is then stored in the database 345 and associated with this particular instance of the framework 360. The requested change in VLAN is then applied to the network device by calling the MakeChange( ) method that actually carries out the forward transaction logic (for example the VLAN ID "X" is added and the VLAN description is updated to indicate that "customer=YYYY" is now associated with it).

In the event that configuration change causes some error outside of the context of this particular workflow 360 (such as a workflow executing at a higher level or even for a different tenant 101), a request for a rollback is signaled to the framework 360. Here, the do( ) method completed cleanly, but the higher scope workflow now indicates that the system needs to reverse the do( ) action by calling the associated undo( ) method. Because the associated undo( ) is inherently part of each flow, the execution framework 360 can infer the proper sequence of undo( ) calls from the history of which do( ) calls were executed. The undo( ) method is responsible for returning the involved infrastructure elements to their original state, prior to the changes performed by the do( ) method. The inputs parameters used to call the do( ) method, the original state information stored in the database 345, and the new current state information are made available to the undo( ) method to perform the required compensating commands.

Because the do( ) method stored the state information obtained from the lower-level CurrentState( ) call prior to making any changes, the corresponding undo( ) method can insure the switch can now be returned exactly to the same state prior to execution of the do( ) method, even if many other changes ensued prior to the rollback request.

The importance of retrieving CurrentState( ) information and storing specific attributes can be appreciated by considering an example. There may be instances in which simply calling an opposite action is not sufficient to compensate for the forward transaction and does not provide the desired result. Consider a situation where a user wishes to add 2 GB of RAM to a VM called 'web01' that currently has 4 GB of RAM, for a total of 6 GB using an "add ram" flow. When the do( ) method calls CurrentState( ) the returned state value might look like the following:

```
{
    Name: web01,
    RAM: 4,
    Cpu_count: 2
}
```

Since the flow is strictly concerned with the amount RAM, the original state saved to the database will only consist of the following:

```
{
    RAM: 4
}
```

The 'Name' and 'Cpu count' attributes are purposefully not saved to avoid unwanted side effects should undo( ) need to be called. The do( ) method proceeds with changing the amount of RAM in the VM.

If an error occurs before the RAM can be changed, the execution framework will call undo( ) which will recognize that the current amount of RAM matches the original amount of RAM, so no compensating action is required. Without the original state information, the undo( ) function might mistakenly reduce the RAM down from 4 GB to 2 GB.

If an error occurs after the RAM was changed, the execution framework will call undo( ) which will compare the current 6 GB of RAM to the original 4 GB value, and recognize that a reduction of 2 GB is required to compensate.

In a third scenario, the RAM change might succeed but still require rollback at a later time. For the purpose of illustration, supposed the VM is renamed to "app02" after the RAM change, yielding the following current state:

```
{
    Name: app02,
    RAM: 6,
    Cpu_count: 2
}
```

If an operator subsequently decides that the RAM was changed by mistake, he can manually roll back the "add ram" flow. Doing so will cause the execution framework to call the undo( ) method, which will compare the current state to the original state, recognize that only the RAM needs to be changed back to 4 GB, leaving the "Name" attribute with the new "app02" value. The resulting final state would be as follows:

```
{
    Name: app02,
    RAM: 4,
    Cpu_count: 2
}
```

Thus the advantage of also storing CurrentState( ) information as part of the undo( ) is seen. This enables the exact reverse of the request to be automatically implemented, ensuring that configuration is returned to its original state.

The CurrentState( ) method stores only that information with a scope commensurate with the attributes that are expected to be affected by the do( ) method. As illustrated by the third scenario of the above "add ram" example, situations can occur where multiple flows from different requests change the configuration to a given element. By limiting the scope of the CurrentState( ) method to be commensurate in scope with the attributes that can possibly be affected by the specific do( ) method can eliminate certain concurrency problems.

Figure 6:
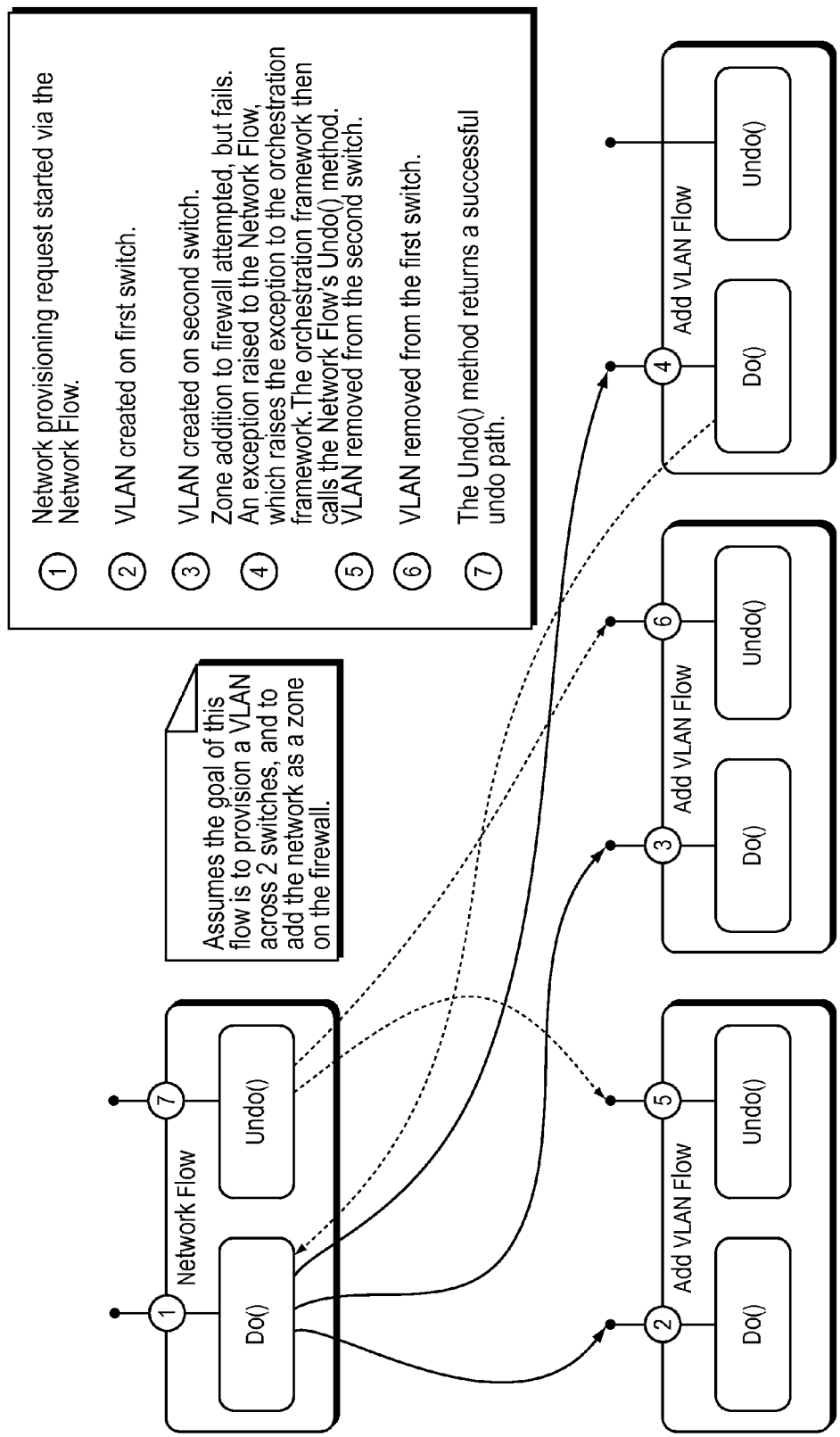
FIG. 6 is an example aggregated flow that provisions a VLAN across two switches and then tags the new VLAN as a zone on a firewall.

FIG. 6 is an example of extending the flow of FIG. 5 by aggregating an individual workflow into larger workflows. In this example, a Network Flow provisioning request is being made to configure a VLAN on two switches and to set a firewall.

The network provisioning request is started via an "add VLAN" flow that causes the VLAN to be created on the first switch. A next step creates the VLAN flow on the second switch. After that, an "add zone" flow creates a new zone on the firewall. This flow however fails and an exception is raised therefore to the higher level Network Flow. The Network Flow then calls the corresponding undo( ) method which in turn causes the undo( ) of the first and second switch. In the end, the system is returned successfully to its prior state.

It should be understood that the example embodiments described above may be implemented in many different ways. In some instances, the various "data processors" described herein may each be implemented by a physical or virtual general purpose computer having a central processor, memory, disk or other mass storage, communication interface(s), input/output (I/O) device(s), and other peripherals. The general purpose computer is transformed into the processors and executes the processes described above, for example, by loading software instructions into the processor, and then causing execution of the instructions to carry out the functions described.

As is known in the art, such a computer may contain a system bus, where a bus is a set of hardware lines used for data transfer among the components of a computer or processing system. The bus or busses are essentially shared conduit(s) that connect different elements of the computer system (e.g., processor, disk storage, memory, input/output ports, network ports, etc.) that enables the transfer of information between the elements. One or more central processor units are attached to the system bus and provide for the execution of computer instructions. Also attached to system bus are typically I/O device interfaces for connecting various input and output devices (e.g., keyboard, mouse, displays, printers, speakers, etc.) to the computer. Network interface(s) allow the computer to connect to various other devices attached to a network. Memory provides volatile storage for computer software instructions and data used to implement an embodiment. Disk or other mass storage provides non-volatile storage for computer software instructions and data used to implement, for example, the various procedures described herein.

Embodiments may therefore typically be implemented in hardware, firmware, software, or any combination thereof.

The computers that execute the processes described above may be deployed in a cloud computing arrangement that makes available one or more physical and/or virtual data processing machines via a convenient, on-demand network access model to a shared pool of configurable computing resources (e.g., networks, servers, storage, applications, and services) that can be rapidly provisioned and released with minimal management effort or service provider interaction. Such cloud computing deployments are relevant and typically preferred as they allow multiple users to access computing resources as part of a shared marketplace. By aggregating demand from multiple users in central locations, cloud computing environments can be built in data centers that use the best and newest technology, located in the sustainable and/or centralized locations and designed to achieve the greatest per-unit efficiency possible.

In certain embodiments, the procedures, devices, and processes described herein are a computer program product, including a computer readable medium (e.g., a removable storage medium such as one or more DVD-ROM's, CD-ROM's, diskettes, tapes, etc.) that provides at least a portion of the software instructions for the system. Such a computer program product can be installed by any suitable software installation procedure, as is well known in the art. In another embodiment, at least a portion of the software instructions may also be downloaded over a cable, communication and/or wireless connection.

Embodiments may also be implemented as instructions stored on a non-transient machine-readable medium, which may be read and executed by one or more procedures. A non-transient machine-readable medium may include any mechanism for storing or transmitting information in a form readable by a machine (e.g., a computing device). For example, a non-transient machine-readable medium may include read only memory (ROM); random access memory (RAM); magnetic disk storage media; optical storage media; flash memory devices; and others.

Furthermore, firmware, software, routines, or instructions may be described herein as performing certain actions and/or functions. However, it should be appreciated that such descriptions contained herein are merely for convenience and that such actions in fact result from computing devices, processors, controllers, or other devices executing the firmware, software, routines, instructions, etc.

It also should be understood that the block and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and thus the computer systems described herein are intended for purposes of illustration only and not as a limitation of the embodiments.

While this invention has been particularly shown and described with references to example embodiments thereof, it will be understood by those skilled in the art that various changes in form and details may be made therein without departing from the scope of the invention encompassed by the appended claims.

What is claimed is:

1. A method for enabling an automated flow for specifying a data processing service as one or more atomic transactions, the method comprising:
   receiving a request for a new configuration of an element or a change in configuration of an element;
   based on the request, forming a flow including at least one forward transaction to satisfy the request;
   collecting and storing current configuration of the element for the purpose of reverting to the original state; and
   in response to receiving an error condition during execution of a forward transactions of the flow, executing at least one reverse transaction corresponding to the forward transaction of the flow that caused the error condition;

wherein the at least one forward and reverse transaction each includes programmatic instructions for provisioning or deprovisioning at least one device or resource in a network of devices or resources.

2. The method of claim 1 wherein the request includes at least one of the following: a request to provision a device in a network of devices, request to create an infrastructure element of a virtual data center (VDC), a request to create a virtual local area network (VLAN), a request to logically configure a network service component, and a request to configure an element of a VDC.

3. The method of claim 1 wherein at least one device or resource is a physical device or resource.

4. The method of claim 1 wherein at least one device or resource is a virtual device or resource.

5. The method of claim 1 wherein at least one programmatic instruction is a logical configuration of either a virtual or physical device.

6. The method of claim 1 wherein executing at least one forward transaction of the flow further comprises provisioning a new device or resource in a network of devices and resources.

7. The method of claim 1 wherein executing the at least one forward transaction of the flow further executes a sequence of programmatic steps that cause a change in state of an existing device or resource in a network of devices or resources.

8. The method of claim 1 further comprising mapping at least one forward transaction to a corresponding reverse transaction.

9. The method of claim 1 wherein executing the at least one reverse transaction rolls back any configuration changes caused by the execution of the corresponding forward transaction.

10. The method of claim 1 wherein the error condition includes at least one of the following: an error that causes provisioning of at least one device or resource to fail, a VLAN identification error, security zone identification error in a firewall, resource allocation error, a VDC provisioning error.

11. The method of claim 1 further comprising:
in response to receiving the request, identifying a service or a change in a service requested;
based on the identified service or change in service requested, identifying a set of devices and resources required to satisfy the request;
based on the identified devices and resources, organizing a set of forward and reverse transactions into a hierarchical flow.

12. The method of claim 11 wherein the set of forward transactions and corresponding reverse transactions are indexed and stored in a data store.

13. A system for managing data processing system elements comprising:
a persistent storage device for storing executable instructions that represent:
a do method including programmatic instructions that when executed implement a new configuration of a data processing element or changes to a configuration of a data processing system element;
a current state method including instructions for collecting and storing current configuration of the element;
an undo method including programmatic instructions that when executed return the configuration of the data processing system element to an original state; and
a processor for
upon request from a higher level flow, executing the do method as a forward transaction,
upon detection of an error resulting from execution of the do method executing the undo method as a reverse transaction, and
optionally executing the current state method as needed, to ensure atomicity; and
wherein the do method and undo method comprise at least one transaction for provisioning and deprovisioning at least one device or resource in a network of devices or resources.

14. The system of claim 13 wherein the request includes at least one of the following: a request to provision a device in a network of devices, request to create an infrastructure element of a virtual data center (VDC), a request to create a virtual local area network (VLAN), a request to logically configure a network service component, and a request to configure any element of a VDC.

15. The system of claim 13 wherein at least one device or resource is a virtual device or resource.

16. The system of claim 13 wherein the persistent storage device further stores a mapping of the do method to the corresponding undo method enabling programming execution of a sequence of that, after execution of the undo method, return at least one device or resource to a state that existing prior to execution of the do method.

17. The system of claim 13, wherein the undo method is executed upon at least one of the following occurring during execution of the do method: an error that causes provisioning of at least one device or resource to fail, a VLAN identification error, security zone identification error in a firewall, resource allocation error, a VDC provisioning error.

* * * * *

UNITED STATES PATENT AND TRADEMARK OFFICE
CERTIFICATE OF CORRECTION

PATENT NO. : 8,935,570 B2
APPLICATION NO. : 13/551848
DATED : January 13, 2015
INVENTOR(S) : Jerry W. Childers, Jr. et al.

It is certified that error appears in the above-identified patent and that said Letters Patent is hereby corrected as shown below:

In the Claims:

Claim 1, Col. 8, line 67 should read:
tion of a forward transaction of the flow, executing at Signed and Sealed this
Fifth Day of May, 2015

Michelle K. Lee
*Director of the United States Patent and Trademark Office*